(12) United States Patent
Zeine et al.

(10) Patent No.: US 9,104,978 B2
(45) Date of Patent: Aug. 11, 2015

(54) SYSTEM AND METHOD FOR PARAMETER EVALUATION

(75) Inventors: Hatem Zeine, Redmond, WA (US); Meir Shmouely, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 770 days.

(21) Appl. No.: 12/900,181

(22) Filed: Oct. 7, 2010

(65) Prior Publication Data

US 2012/0089544 A1    Apr. 12, 2012

(51) Int. Cl.
*G06N 3/00* (2006.01)
*G06N 99/00* (2010.01)

(52) U.S. Cl.
CPC ................... *G06N 99/005* (2013.01)

(58) Field of Classification Search
CPC ................ G06N 3/02; G06N 3/086
USPC ......................................................... 706/62
See application file for complete search history.

(56) References Cited

U.S. PATENT DOCUMENTS

| | | | |
|---|---|---|---|
| 7,280,987 B2 | 10/2007 | Chen et al. | |
| 2003/0088458 A1* | 5/2003 | Afeyan et al. | 705/10 |
| 2004/0143668 A1* | 7/2004 | Falk et al. | 709/228 |
| 2009/0150385 A1* | 6/2009 | Clary et al. | 707/5 |
| 2010/0070498 A1* | 3/2010 | Zhang et al. | 707/736 |
| 2010/0076580 A1 | 3/2010 | Kitahara | |

OTHER PUBLICATIONS

Draghici, S., (untitled presentation), http://psb.stanford.edu/psb01/DAT/Hawaii4.pdf, also available at https://web.archive.org/web/20060901101946/http://psb.stanford.edu/psb01/DAT/Hawaii4.pdf, available since at least Sep. 2006, pp. 1-3.*
Guyon, I. and Elisseeff, A., "An Introduction to Variable and Feature Selection", J. Mach. Learning Res., vol. 3, 2003, pp. 1157-1182.*
Hastie, T. et al., The Elements of Statistical Learning: Data Mining, Inference, and Prediciton, Second Ed., Dec. 2009, pp. 45-140.*
M. Srinivas and L. Patnaik, "Genetic Algorithms: A Survey", IEEE Computer, vol. 27, No. 6, pp. 17-26, Jun. 1994.*
R. Leardi, "Genetic Algorithms in Feature Selection", in Genetic Algorithms in Molecular Modeling, (J. Devillers, Ed.), Academic Press, London, pp. 67-70, 1996.*
Y. Zhefu et al., "A GA-Based Feature Extraction and Its Application", 2009 Int'l Symp on Intelligent Ubiquitous Computing and Education, pp. 3-5.*

(Continued)

*Primary Examiner* — Kakali Chaki
*Assistant Examiner* — Vincent Gonzales
(74) *Attorney, Agent, or Firm* — Joann Dewey; Jim Ross; Micky Minhas

(57) ABSTRACT

The described implementations relate to machine learning. One implementation provides a technique involving logging data that includes outcomes and values of first and second parameters that are associated with the outcomes. The technique can also include determining an equation that includes a first coefficient for the first parameter and a second coefficient for the second parameter, normalizing the first coefficient based on the values of the first parameter, and normalizing the second coefficient based on the values of the second parameter. The first parameter and the second parameter can be ranked in order of contribution to the outcomes based on the normalized first and second coefficients.

20 Claims, 6 Drawing Sheets

(56) References Cited

OTHER PUBLICATIONS

Ilin, Alexander, "Advanced source separation methods with Applications to spatio-temporal datasets", Retrieved at <<http://lib.tkk.fi/Diss/2006/isbn9512284251/isbn9512284251.pdf>>, Date: 2006, pp. 132.

"ManageEngine QEngine", Retrieved at <<http://www.manageengine.com/products/qengine/performance-testing.html>>, Retrieved Date: Sep. 3, 2010, pp. 2.

"Best Practices for Speeding Up Your Web Site", Retrieved at <<http://developer.yahoo.com/performance/rules.html>>, Retrieved Date: Sep. 3, 2010, pp. 12.

"Web Design Discussion" Retrieved at <<http://www.drostdesigns.com/web-page-design-7-factors-affecting-website-performance/>>, Retrieved Date: Sep. 3, 2010, pp. 6.

"Analysing Website Performance", Retrieved at <<http://www.panalysis.com/services/website_performance_analysis.php>>, Retrieved Date: Sep. 3, 2010, pp. 2.

"What factors affect the performance of a website", Retrieved at <<http://uk.answers.yahoo.com/question/index?qid=20071017151145AAC2UYb >>, Retrieved Date: Sep. 3, 2010, pp. 1.

\* cited by examiner

| TABLE 400 | | | | | | | | | |
|---|---|---|---|---|---|---|---|---|---|
| 401 | 402 | 403 | 404 | 405 | 406 | 407 | 408 | 409 | 410 |
| Page Load | File Name | PLT (seconds) | Page Size (MB) | File Size (MB) | Domain Name | Num Files | Num Domains | Largest File Size (MB) | Connection Speed (MBPS) |
| 1 | A1 | 2.00 | 1.60 | | domain1 | 14 | 6 | 1.00 | 8.00 |
| | | | | 1.00 | domain2 | | | | |
| | ... | | | | | | | | |
| | A14 | | | 0.10 | domain2 | | | | |
| 2 | B1 | 1.00 | 2.00 | 0.50 | domain3 | 10 | 2 | 0.50 | 27.00 |
| | | | | | domain4 | | | | |
| | ... | | | | | | | | |
| | B10 | | | 0.70 | domain7 | | | | |
| 3 | C1 | 1.50 | 1.90 | 0.10 | domain2 | 22 | 17 | 0.80 | 14.00 |
| | | | | | domain4 | | | | |
| | ... | | | | | | | | |
| | C22 | | | 0.04 | domain2 | | | | |
| ... | | | | | | ... | | | |

FIG. 4

SYSTEM AND METHOD FOR PARAMETER EVALUATION

BACKGROUND

Automated techniques can be used to determine solutions based on an underlying data set, such as a set of measurements. As a specific example, machine learning techniques can be applied to such a data set to determine a "best fit" equation. More generally, machine learning solutions may be represented as mathematical or logical constructs that approximate theoretically ideal solutions. Once a solution has been derived using such automated techniques, it is often relatively straightforward to apply the solution to an existing problem. For example, a best fit equation may be used to estimate future measurements simply by evaluating the equation for a given set of parameters.

Automated solutions may also reflect some information about the nature of the underlying problem to which they are applied. However, this information may not be readily apparent from simply observing such an automated solution. As an example, a machine learning solution represented as an equation may include coefficients that are learned by the machine learning algorithm. While the coefficients may be effective for accurately estimating future outcomes based on the set of parameters, it may not be apparent to a human observer how these coefficients reflect the relative contribution of the various parameters to the outcomes.

SUMMARY

The described implementations relate to machine learning and specifically to the application of machine learning to evaluate the contribution of parameters to outcomes. In one specific implementation, genetic algorithms are used to evaluate the contribution of web page parameters to outcomes such as web page load times.

One technique can include logging data that includes outcomes and values of first and second parameters that are associated with the outcomes. The technique can also include determining an equation that includes a first coefficient for the first parameter and a second coefficient for the second parameter. The technique can also include normalizing the first coefficient based on the values of the first parameter, and normalizing the second coefficient based on the values of the second parameter. The first parameter and the second parameter can be ranked in order of contribution to the outcomes based on the normalized first and second coefficients.

Another implementation is manifested as a system that includes a database component and a parameter evaluator. The database component can be configured to store data including outcomes and values of parameters that are associated with the outcomes. The parameter evaluator can be configured to generate an equation based on the data, and the equation can include terms having coefficients and individual parameters. The parameter evaluator can also be configured to normalize the coefficients for the terms based on the stored values of the individual parameters, such that the normalized coefficients reflect relative contributions of the terms to the outcomes.

Another implementation is manifested as a one or more computer-readable storage media having stored instructions to cause one or more processors to perform acts. The acts can include monitoring web page load times for one or more web pages, storing the web page load times in a database with associated values of web page parameters, and applying a genetic algorithm to the web page load times and the associated parameter values to generate a winning equation. The winning equation can include coefficients and the web page parameters. The acts can also include normalizing the coefficients based on the values of the web page parameters, and ranking the web page parameters for contribution to the web page load times based on the normalized coefficients.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIG. 4 shows an example of a data structure stored by certain devices in accordance with some implementations of the present concepts.

DETAILED DESCRIPTION

Overview

This document relates to data evaluation, and more specifically to using certain techniques to evaluate the influence of parameters on outcomes. In one specific example, the outcomes are the amount of time it takes for particular web pages to load, measured from when a user requests a web page until the web page is fully loaded on their computer. In this example, the parameters are web page parameters such as the size of a web page, the number of files in the web page, the size of the largest file for the web page, etc., each of which may affect the amount of time it takes to download a web page.

In some embodiments, machine learning algorithms are used to obtain an equation that is a "best fit" for the outcomes, and the equation is evaluated to determine the relative influence of the parameters. Unless otherwise indicated, the term "machine learning" will generally be used to refer to various types of techniques, including, but not limited to, artificial intelligence (e.g., genetic algorithms), machine learning, stochastic, probabilistic, and/or Bayesian techniques.

Figure 1:
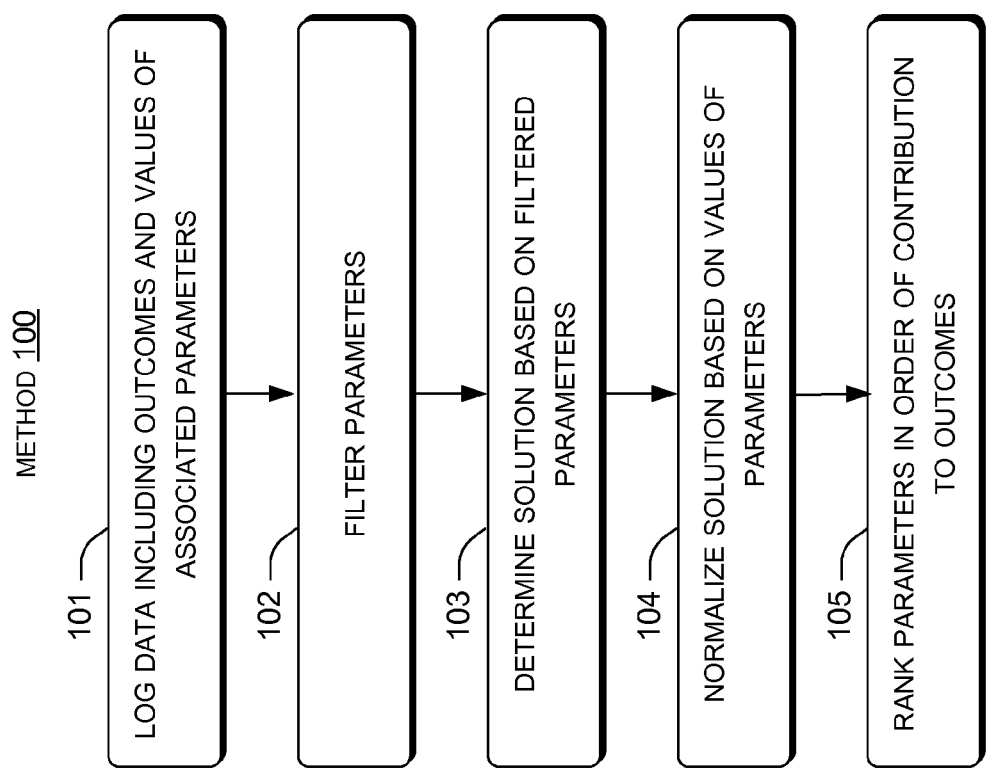
FIGS. 1, 5, and 6 show flowcharts of exemplary methods that can be accomplished in accordance with some implementations of the present concepts.

For purposes of explanation, consider introductory FIG. 1. FIG. 1 shows a method 100 for evaluating relative contributions of parameters to outcomes.

Data, including outcomes and values of parameters associated with the outcomes, can be logged at block 101. For instance, a number of outcomes (e.g., measurements) and values of certain parameters associated with each outcome can be logged in a database. The parameters can include variables such as a, b, c, x, y, and z. Thus, each outcome can be associated with particular values of a, b, c, x, y, and z.

The parameters can be filtered at block 102. The parameters can be filtered using manual or automated techniques. For example, a knowledgeable individual can determine that parameters a, b, and c are unlikely to influence the outcomes. Thus, parameters a, b, and c can be filtered out of the set of parameters, leaving x, y, and z. Alternatively, block 102 can include filtering the parameters by having the knowledgeable individual determine those parameters that are likely to influence the outcomes, e.g., by selecting x, y, and z as the filtered parameters.

A solution can be determined based on the filtered parameters at block 103. For example, machine learning techniques can be used to learn a solution in the form of an equation that is a function of the filtered parameters, e.g., x, y, and z. A neural network, genetic algorithm, or other machine learning technique can produce an equation such as x+10y+100z=outcome. The equation represents an expected measurement for any values of x, y, and z. Note that block 103 can be also be performed without filtering the parameters, e.g., on each of the parameters logged at block 101.

The solution can be normalized based on the values of the parameters at block 104. As an example, the coefficients can be normalized by dividing them by the average values of the parameters that are logged at block 102. Thus, if the average value of the x parameter is 10, the x parameter coefficient is normalized to 1/10, i.e., 0.1. Likewise, if the average value of the y parameter is 1, the y parameter coefficient is normalized to 10/1, i.e., 10, and if the average value of the z parameter is 100, the z parameter coefficient is normalized to 100/100, i.e., 1.

The parameters can be ranked in order of contribution to the outcomes at block 105. For example, the parameters can be ranked based on the relative values of their normalized coefficients. Thus, the parameters would be ranked y, z, x, based on their corresponding normalized coefficients of 10, 1, and 0.1, respectively.

Note that the parameters can be ranked in the relative order of contribution of each variable to the outcomes. In this example, an individual trying to affect future outcomes can concentrate on addressing the y parameter, because the y parameter is expected to have the most influence on future outcomes based on the normalized rankings. Without normalizing and ranking the coefficients as discussed above, it may be difficult for the individual to determine the relative contribution of the x, y, and z parameters to the measured quantities.

Consider the exemplary equation discussed above, i.e., x+10y+100z=outcome. Without the benefit of the ranked, normalized coefficients, it may appear that the z parameter has the highest contribution to the measured outcomes, because the z parameter has the largest corresponding coefficient of 100. However, by normalizing and ranking the coefficients as discussed above, it is apparent that concentrating first on the y parameter will likely have a greater impact at affecting future outcomes.

Furthermore, in some embodiments, the machine learning equation is not necessarily a linear combination of individual parameters. Rather, the machine learning equation could be in a nonlinear form such as $x^2+10y/z+100 \log(z)$=outcome. In this case, the coefficients are still 1, 10, and 100. However, the equation terms $x^2$, y/z, and log(z) are not identical to the parameters logged at block 102. In this case, the normalizing function of block 104 can also include calculating the average value for each term in the logged data. Thus, block 104 could include calculating average values of $x^2$, y/z, and log(z).

Furthermore, in some embodiments, the equation can be represented without using a constant term. Generally speaking, many machine learning or other automated techniques will provide solutions in a form such as ax+by+cz+d=outcome, where a, b, and c are coefficients of parameters x, y, and z, and d represents a constant term. Such constant terms may be helpful for purposes of generating optimal or near-optimal solutions. However, in such an equation, the constant provides little or no information about the relative weight of the individual parameters. Thus, in some cases, it is useful to constrain the automated techniques to solutions that do not include constant terms. By doing so, each term of the equation includes a parameter, and therefore provides some information content about the influence on the parameters on the outcomes.

Also note that it may be desirable, in some implementations, for the solution discussed above to be in the form of a polynomial equation. For example, a polynomial equation may include terms that are combined with addition (+) or subtraction (−) operators, and each term can be normalized independently of the other terms in the equation. Furthermore, note that the terms of a polynomial equation can include individual parameters that are combined by operators such as multiplication (*) and/or division (÷ or /).

Furthermore, note that the ranking of the parameters can also be used for automated filtering techniques, e.g., at block 102 of method 100. For example, method 100 can be performed iteratively, and the lowest-ranked parameter from the previous iteration can be filtered out at block 102. Thus, as an example, method 100 could be performed a first time with the six parameters mentioned above, i.e., a, b, c, x, y, and z. After the first iteration, the parameters can be ranked so that the lowest-ranking parameter is parameter a. Method 100 can be performed again without parameter a, i.e., using parameters b, c, x, y, and z. Method 100 can be iterated in this manner until a particular number of parameters are remaining, in this example, three parameters x, y, and z.

Example Scenario

As discussed above, the present implementations can offer insight into the relative contribution of different parameters to an outcome. As a particular example, web page load times may be affected by various web page parameters, such as the total size of the web page (e.g., in bytes), the total number of files included in the web page, and/or the size of the largest file, among others. Disclosed implementations can rank the relative contribution of the total size of the web page, the total number of files, and the size of the largest file. Web developers can concentrate their efforts to improve or optimize page load times by making changes to the high-ranked parameters. For example, if the total number of files is the highest-ranked parameter, developers can prioritize reducing the number of files for a particular web page, instead of concentrating on reducing the total size of the web page in bytes or the size of the largest file.

Figure 2:
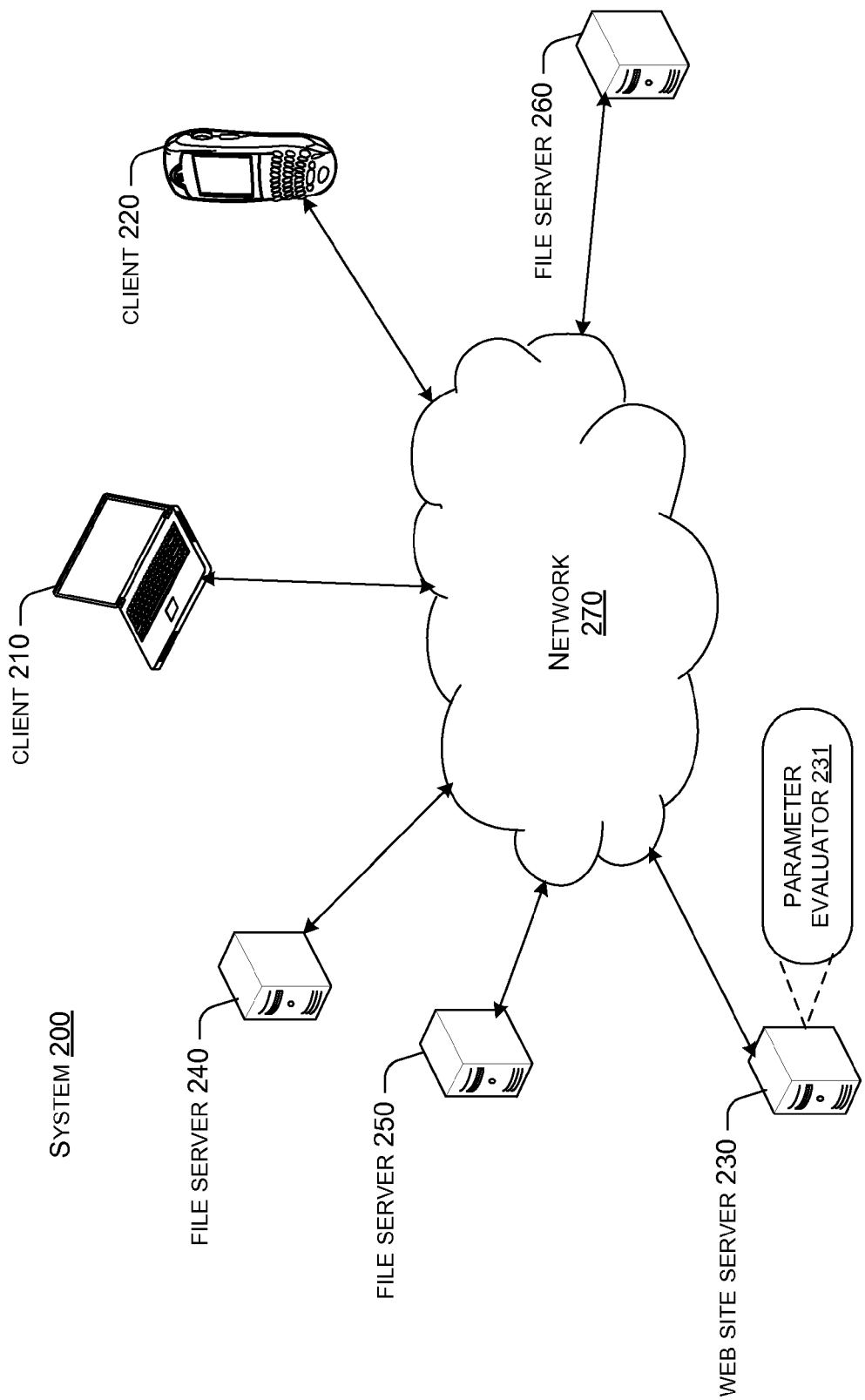
FIG. 2 shows an example of a web server scenario in accordance with some implementations of the present concepts.

FIG. 2 shows an exemplary system 200 that is consistent with the disclosed implementations. As shown in FIG. 2, system 200 includes numerous devices such as client devices 210 and 220, web site server 230, and file servers 240, 250, and 260, each connected to a network 270. Each device shown in FIG. 2 can include one or more computer processors executing instructions in a memory.

Client devices 210 and 220 can be configured to access various contents that are available over network 270. For example, client devices 210 and 220 can access web site server 230 to obtain a web page, which can then be displayed to a user. Web site server 230 can provide certain content, e.g., a main HTML file, to client devices 210 and/or 220 directly, by transmitting the main HTML file over network 270 to client devices 210 and/or 220.

However, the web site can also include additional files that are hosted remotely from web site server 230, e.g., on file servers 240, 250, and 260. For example, image, video, audio, or other multimedia files can be hosted on file servers 240, 250, and/or 260. Likewise, files such as word processing files, spreadsheets, and/or database files can also be hosted on one or more of the file servers. Thus, when client devices 210 and/or 220 retrieve the web page, only some of the content (e.g., the main HTML page) is actually being directly transmitted by web site server 230, and the remaining content (e.g., a multimedia file) is provided by the hosting file server. In some cases, the various file servers can be associated with different domains than web site server 230. If so, retrieving the full web page can require domain name resolution of the hosting file servers as well as web site server 230.

Web site server 230 can also include a parameter evaluator 231 that is configured to implement techniques such as those discussed above with respect to method 100. By doing so, web site server 230 can enable a web developer of the web page to focus development efforts to reduce the page load time of the web page. In turn, this may result in a more satisfying user experience for the users of client devices 210 and 220.

Figure 3:
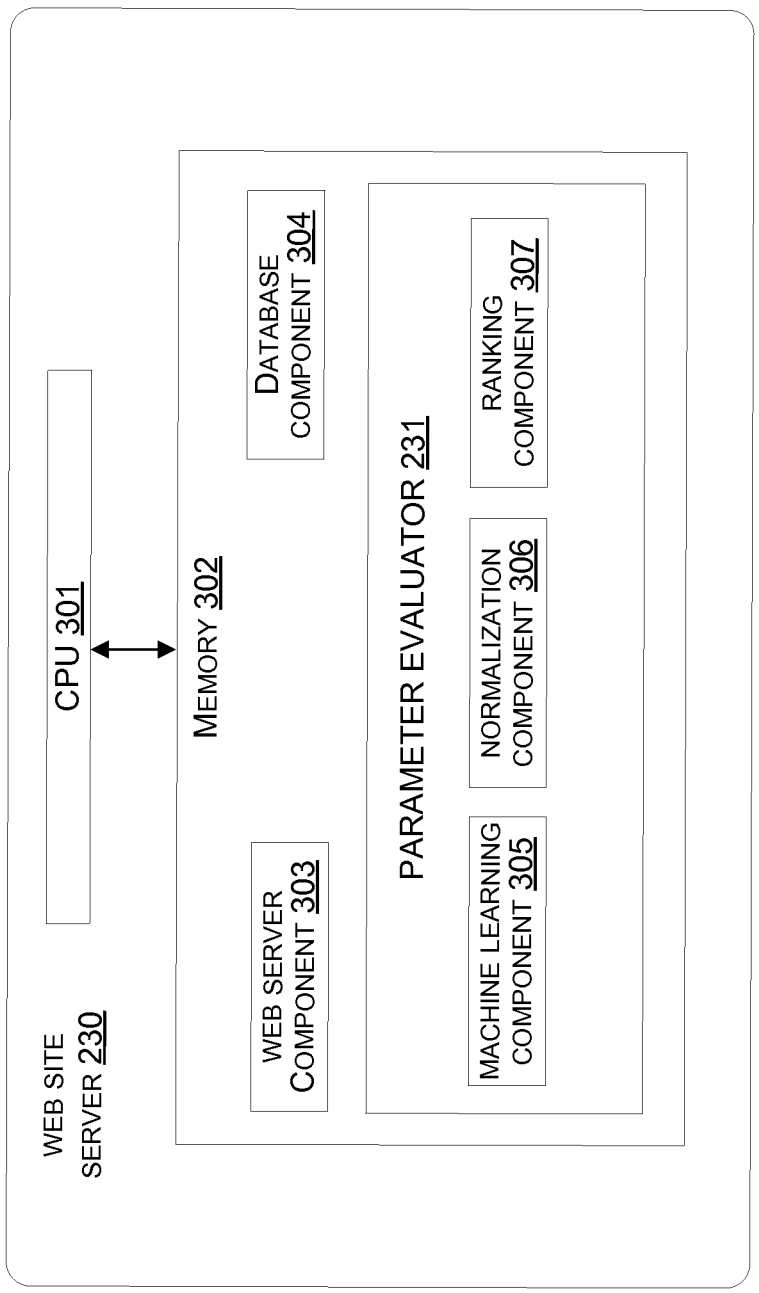
FIG. 3 shows exemplary components of a device in accordance with some implementations of the present concepts.

FIG. 3 shows an exemplary architecture of web site server 230 that is configured to accomplish the concepts described above and below. Web site server 230 can include a central processing unit ("CPU") 301, operably connected to a memory 302. For example, CPU 301 can be a reduced instruction set computing (RISC) or complex instruction set computing (CISC) microprocessor that is connected to memory 302 via a bus. Memory 302 can be a volatile storage device such as a random access memory (RAM), or non-volatile memory such as FLASH memory. Although not shown in FIG. 3, web site server 230 can also include various input/output devices, e.g., keyboard, mouse, display, printer, etc. Furthermore, web site server 230 can include one or more non-volatile storage devices, such as a hard disc drive (HDD), optical (compact disc/digital video disc) drive, tape drive, etc. Generally speaking, any data processed by web site server 230 can be stored in memory 302, and can also be committed to non-volatile storage.

Memory 302 of web site server 230 can include various components that implement certain processing described herein. For example, memory 302 can include a web server component 303, a database component 304, and parameter evaluator 231. Parameter evaluator 231 can include a machine learning component 305, a normalization component 306, and a ranking component 307. Components 231 and 303-307 can include instructions stored in memory 302 that can be read and executed by central processing unit (CPU) 301. Furthermore, components 231 and 303-307 can also be stored in non-volatile storage and retrieved to memory 302 to implement the processing described herein.

Web server component 303 can be configured to provide one or more web pages over network 270, for example to client devices 210 and 220. Database component 304 can be configured to store page load times and associated parameters for the web pages in a database. Database component 304 can update the database as web server component 303 serves various web pages to requesting client devices.

Database component 304 can receive page load times for web pages in several different ways. For example, web browsers on client devices 210 and 220 can be configured to report page load times to database component 304. Alternatively, the web pages can include scripting code configured to, upon execution by client device 210 and 220, report the page load times to database component 304. Note that database component 304 can also receive and store page load times for web pages that are hosted remotely, i.e., by devices other than web site server 230.

Parameter evaluator 231 can be configured to evaluate the relative contribution of various parameters to an outcome. To do so, parameter evaluator 231 can include several components, including machine learning component 305. Machine learning component 305 can be configured to implement various machine-learning techniques, such as those disclosed herein. For example, machine learning component 305 can implement genetic algorithms, neural networks, clustering, Bayesian or other probabilistic models, etc., as part of block 103 of method 100. In the example that follows, a genetic algorithm is implemented by machine learning component 305.

Normalization component 306 can be configured to perform processing such as discussed above with respect to block 104 of method 100. For example, normalization component 306 can receive, from machine learning component 305, an equation reflecting one or more parameters. Normalization component 306 can access database component 304 to compute the average value of each parameter in the equation. Normalization component 306 can then divide the equation coefficients by the average values of the corresponding parameters. In the example that follows, the equation estimates web page load times.

Ranking component 307 can be configured to perform processing such as discussed above with respect to block 105 of method 100. For example, ranking component 307 can rank the normalized equation parameters. Furthermore, ranking component 307 can output the ranked equation parameters to a user, for example by writing the ranked equation parameters to a file or displaying them in a graphical user interface on a display device. In the example that follows, the parameters are ranked according to their contribution to web page load times.

Note that parameter evaluator 231 is described below with respect to implementations on web site server 230. However, parameter evaluator 231 can be embodied on various types of devices. For example, parameter evaluator 231 can be embodied on a personal computer (PC), laptop, cell phone, personal digital assistant, PDA, etc. Furthermore, the functionality described herein with respect to parameter evaluator 231 can be distributed across multiple devices.

Likewise, parameter evaluator 231 can be implemented in scenarios other than the web site server scenario outlined herein. For example, parameter evaluator 231 could be embodied in a database system and used to determine the relative contribution of processor speed, memory size, and/or disk performance to the overall performance of the database system. As another example, parameter evaluator 231 could be embodied in a control system for a building air conditioner. In such an embodiment, parameter evaluator 231 could be used to determine the relative contribution of fan speed, window size, shading, etc. to the temperature of one or more rooms in the building. Note also that parameter evaluator 231 does not necessarily need to be part of the system it is used to evaluate, e.g., parameter evaluator 231 can be implemented on a stand-alone device.

FIG. 4 illustrates an exemplary table 400. Table 400 can be included in a database maintained by database component 304. As shown in FIG. 4, page load column 401 identifies instances where a web page was downloaded by client device 210 and/or 220, such as a web page hosted on web site server 230. Note that, for brevity and clarity, FIG. 4 illustrates only three instances where the web page was downloaded. However, corresponding columns 402-410 can be stored for any number of page loads, by any number of client devices. Furthermore, the page loads reflected in table 400 are not necessarily for a web page that is hosted on web site server 230. Rather, the web page can be hosted on a different web site server or other device. Note also that the following discussion assumes, for the sake of clarity, that table 400 includes web page loads for a single web page. However, in some implementations, table 400 can include web page loads for multiple web pages hosted at multiple web servers.

File name column 402 identifies files that were downloaded for the page load instances that are identified in column 401. PLT (page load time) column 403 identifies the time, in seconds, it takes for the web page to load at client device 210 and/or 220. While table 400 illustrates only three page load instances for the web site, many more measurements of page load times can be taken for the web site. In some implementations, measurements can be taken and stored in table 400 each time a client device requests the web page from web site server 230 or another web site server. Page size column 404 identifies the total size of the corresponding web page, including the associated files, in megabytes. Note that different instances of page loads can be associated with different values for columns 402-410, as the web page can change over time.

Table 400 also includes certain file-specific columns. For example, file size column 405 identifies the file size, in megabytes, of the corresponding file from column 402. Domain column 406 identifies the domain of either the main web page or the particular file identified in column 402.

Number of files ("num files") column 407 identifies the total number of files that were downloaded for each page load instance in column 401. Number of domains ("num domains") column 408 identifies the total number of domains that were accessed to download all of the files associated with the page load instance. Note that, in some cases, the web page can include several different files that are remotely hosted at the same domain. In such a case, the number of domains associated with the web page can be less than the number of files. Largest file size column 409 identifies the size of the largest file associated with the web page, in megabytes. Connection speed column 410 identifies the connection speed, in megabytes per second ("MBPS") that the downloading device used to download the webpage. A manner in which table 400 can be utilized is discussed below.

Figure 5:
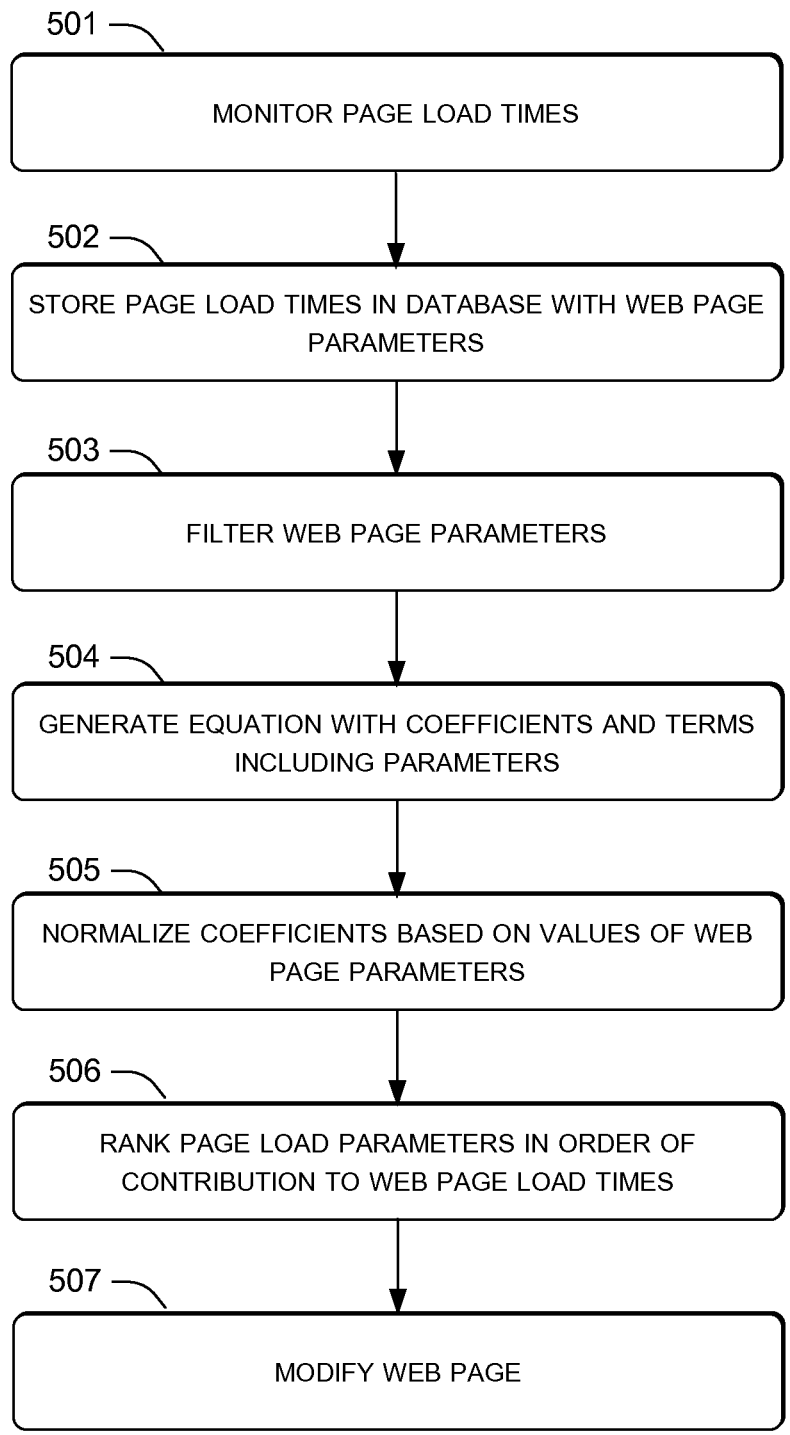

FIG. 5 illustrates a method 500, also suitable for implementation in system 200 or other systems. Web site server 230 can implement method 500, as discussed below. Note that method 500 is shown as being implemented on web site server 230 for exemplary purposes, but is suitable for implementation on many different types of devices.

Web page load times can be monitored at block 501. For example, web site server 230 can monitor several different instances where a web page that is hosted on web site server 230 is loaded by client devices 210 and/or 220. Browser software on client devices 210 and 220 can determine the page load times on the client devices, and provide the page load times to web site server 230. For example, the browser software can determine the time between the user "clicking" on a web link or otherwise requesting the web page until the page is fully loaded on the client device. Alternatively, the web page can include scripting code, such as JavaScript™, that is executed by client devices 210 and 220. The scripting code can return the page load times to web site server 230.

Page load times can be stored in a database with web page parameters at block 502. For example, database component 304 can store web page load times in column 403 with associated web page parameters, such as columns 404-410.

The web page parameters can be filtered at block 503. For example, columns 404-410 can be potential parameters for a machine learning technique, and these parameters can be filtered to remove parameters that are not expected to significantly contribute to web page load times. For reasons that follow, it may be beneficial to filter these parameters out at block 503.

Many machine learning techniques, such as genetic algorithms, are capable of operating with a relatively large number of parameters. However, in many cases, the convergence of such techniques to a satisfactory solution can take a very long time. Indeed, in some cases, the information obtained from a machine learning algorithm may be stale by the time the algorithm converges unless steps are taken to speed convergence of the algorithm. By filtering the number of parameters used as inputs to the machine learning technique, the convergence time can be greatly reduced.

In this example, the size of the web page identified in column 404 is selected as the x parameter. Similarly, the number of files identified in column 407 is selected as the y parameter, and largest file size identified in column 409 is selected as the z parameter. Thus, columns 405, 406, 408, and 410 are filtered from the set of possible parameters, leaving columns 404, 407, and 409 as the filtered parameters.

An equation can be generated in block 504. For example, a genetic algorithm can be applied to the filtered parameters to generate the equation. As discussed in more detail below, the genetic algorithm evaluates the fitness of various potential solutions, e.g., equations that are functions of x, y, and z. The fitness of the solution can be evaluated based on how accurately the solution predicts page load times (PLTs) for the web page, based on the x, y, and z parameters mentioned above. The "fittest" function learned by the genetic algorithm can be considered the winning solution. For example, the genetic algorithm can provide the winning solution as an equation, PLT=20x+15y+z. Note that the equation can include coefficients that are learned by the genetic algorithm, e.g., 20 for the x parameter, 15 for the y parameter, and 1 for the z parameter.

The coefficients of the output equation can be normalized at block 505. For example, the coefficients can be normalized by dividing the coefficients by the average value of the corresponding parameters, x, y, and z. For example, the average value of the x parameter can be 10, the average value of the y parameter can be 5, and the average value of the z parameter can be 2. In other words, the average web page size is 10 megabytes, the average number of files is 5, and the average largest file for each web site is 2 megabytes. Thus, by dividing each coefficient by the average value of the corresponding parameter, the x coefficient parameter can be normalized to 20/10, i.e., 2. Likewise, the y coefficient parameter can be normalized to 15/5, i.e., 3, and, the z coefficient parameter can be normalized to 1/2, i.e., 0.5.

The web page parameters can be ranked in order of contribution to web page load times at block 506. For example, the parameters can be ranked based on the relative values of their normalized coefficients. As discussed above, the web page parameters are ranked as y, x, z based on their corresponding normalized coefficients of 3, 2, and 0.5, respectively.

The web page can be modified at block 507. For example, a developer may note that, given the ranking of the parameters, the number of files of the web page has the greatest influence on the page load times for the web site. Thus, the developer may make efforts to reduce the number of files associated with the web page. For example, files may be omitted from the web page, or multiple files may be consolidated into a single file.

Note that the parameters are ranked in the relative order of contribution of each variable to the outcome, e.g., the page load times of the web page. In this example, a web developer may concentrate on addressing the y parameter, or the total number of files, to reduce page load times. Without normalizing and ranking the coefficients as discussed above, it may be difficult for the web developer to determine the relative contribution of the x, y, and z parameters. As discussed, the page load time equation produced by the algorithm was 20x+15y+z. Thus, the developer may have concentrated on the x parameter (total web page size) because the x parameter has the largest corresponding coefficient of 20. However, by normalizing and ranking the coefficients as discussed above, it is apparent to the developer that concentrating first on the y parameter (total number of files) will likely be more effective at reducing page load times for the web page.

Furthermore, once the developer makes changes to reduce the total number of files in the system, the total number of files may no longer be the largest contributor to page load times. Rather, once the total number of files is satisfactorily reduced, the largest file size or the size of the web page may become the main factor in page load times. Thus, in some implementations, method 500 can be performed iteratively as changes are made to the parameters. For example, after the developer makes changes to reduce the number of files, method 500 can be performed again and produce a different result. This time, the parameters can be ranked in the order (x, z, y), which suggests the developer could concentrate on reducing the x parameter, or total page size, to further reduce page load times.

The information provided by the ranked parameters may also be informative for further refinements of method 500. For example, consider a file server hosting a large number of files. Upon receiving a request for the files, the file server can search its local file system, retrieve each requested file, and transmit the requested files across network 270 to the requesting client device. In some cases, the files may not be available in cache memory, and instead are retrieved from a slower storage component, such as a permanent storage disk. In such a system, it is likely that associating large numbers of files with a particular web page (i.e., large values for the y variable) will result in at least some files that are not available from the server in cached memory.

Thus, in the example given above, the major underlying contributor to page load times may actually be due to the uncached files, and not necessarily the total number of files. However, from the x, y, and z files identified above, the y variable is the variable that is most closely associated with uncached files, because web sites with large numbers of files are more likely to have uncached files. Under these circumstances, the developer may wish to add a "cached" flag to table 400. By doing so, the developer may be able to obtain more refined information from the genetic algorithm outputs. By repeating method 400 with this additional parameter, the developer is able to obtain a deeper understanding of how the caching behavior contributes to page load times.

As discussed above, the terms produced by the genetic algorithm are not necessarily constrained to linear combinations of individual parameters, although this is also possible. For example, certain terms can include exponential, logarithmic, or other functions of the variables. For example, if the equation produced by the genetic algorithm includes the variable $x^2$, this suggests that the page load time can be expected to increase approximately with the square of the x parameter.

Likewise, the equation can include terms such as x/z. An equation with such a term suggests that the ratio of the x/z parameters has some influence on the page load times. If the x/y term has a relatively high ranking, the developer may concentrate on reducing the ratio between these parameters, e.g., by decreasing the average of the x parameter or increasing the average of the y parameter. Generally speaking, a high ranking for a term with more than one parameter may indicate that the relationship between the parameters is important. As a specific example, consider an equation with a highly-ranked term z/x. Since z represents the largest file size and x represents the total size of the web page, a highly-ranked z/x term could indicate that the data distribution of the files for a web page preferably may be addressed, perhaps by distributing the largest file across several smaller files.

Furthermore, it is possible to normalize the coefficients at block 505 by dividing them by values other than the mathematical average of the corresponding parameter. For example, the median values of the parameter can be used. Furthermore, certain data processing techniques such as smoothing and removing outliers can be performed in conjunction with the steps above.

Genetic Algorithm

Figure 6:
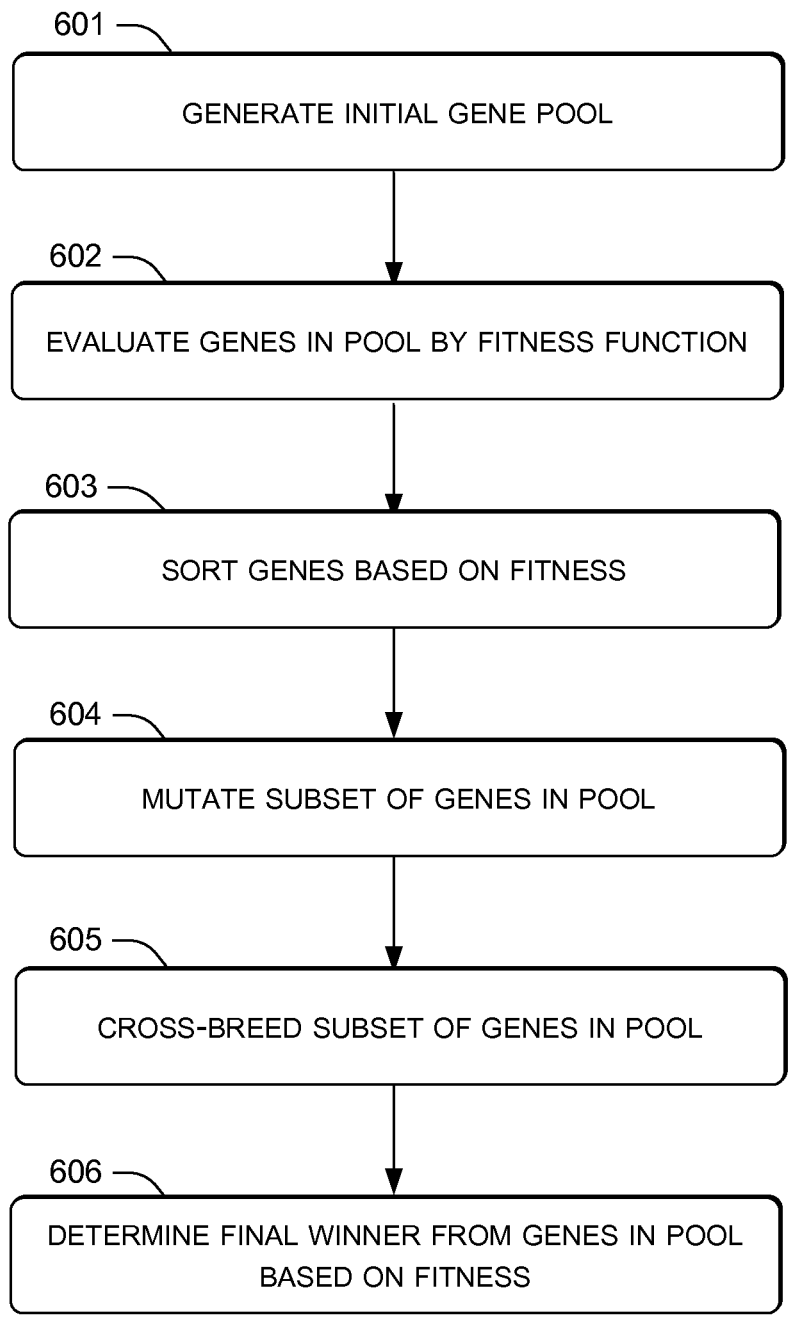

FIG. 6 illustrates an exemplary method 600 for applying a genetic algorithm to web page load times. In one implementation, method 600 can be performed as part of block 504 of method 500.

An initial gene pool can be generated at block 601. For example, the genes in the initial pool can include equations that include coefficients, variables, and/or mathematical operators. In some implementations, the genes can be randomly generated to form the initial pool of genes. Alternatively, the initial genes can be selected manually. For the purposes of example, a first initial gene can be an equation such as PLT=15x+7y, and a second initial gene can be an equation such as PLT=2x+94y+6z/x.

The coefficients, variables, and/or operators can be randomly selected to generate the initial genes. For example, the coefficients can be randomly selected from a preset range, e.g., 1-1000. The variables can be randomly selected from the various columns in table 400, or, as discussed, can be provided by the filtering operation of block 503. The operators can also be randomly selected from various math operations such as +, −, *, ÷, log, etc.

The genes in the pool can be evaluated at block 602. For example, the equations can be applied to each entry in table 400 to calculate a web page load time for the web page. Next, the difference between the value calculated by the gene (equation) and the measured PLT in column 403 is determined. Each difference is squared and summed to determine the squared error of the equation over all of the measured page load times in table 400.

The genes can be sorted based on fitness at block 603. For example, the squared error calculated at block 602 can be considered a fitness function for the genetic algorithm, with lower values of squared error corresponding to more "fit" genes. Thus, the equations with the lowest squared errors would be at the top of the sorted gene pool, and the genes with the highest squared errors would be at the bottom of the sorted gene pool.

Next, a subset of genes in the pool are mutated at block 604. For example, a fixed percentage of the sorted gene pool can be selected for mutation. Assuming a pool of 100 equations, 10 equations can be randomly selected for mutation, i.e., 10% of the gene pool. The mutated genes can replace some of the genes currently in the gene pool. For example, the lowest 10% of the genes can be replaced. Alternatively, genes can be randomly selected for replacement, for example by randomly replacing 10 of the 50 lowest-ranking genes.

The mutations can involve altering the coefficients, parameters, and/or operators. For example, given the first equation introduced above, PLT=15x+7y, the x coefficient of 15 can be randomly mutated to a different value, e.g., 27. The parameters can also be mutated, for example by introducing the z parameter into the equation, perhaps with a random coefficient of 4. The z parameter can also be introduced with a randomly selected operator, e.g., a division operator, for a final mutated equation of 27x+7y/4z.

A subset of genes in the pool can be cross-bred at block 605. Like mutations, cross-breeding can be performed on a fixed percentage of the sorted gene pool, e.g., the top 10%. For example, coefficients, parameters, and operators from one equation can replace coefficients, parameters, and operators from another equation. Consider the mutated first equation of 27x+7y/4z and the second equation 2x+94y+6z/x. The term 27x can be taken from the first mutated equation to replace any term from the second equation, e.g., the 94y term. Thus, cross-breeding the mutated first equation with the second equation can result in an equation such as 2x+27x+6z/x (i.e., 29x+6z/x). Like mutated equations, cross-bred equations can replace a fixed percentage of the lower-ranking equations in the gene pool. Alternatively, cross-bred equations can randomly replace a subset of the equations in the gene pool.

Method 600 can be performed iteratively. For example, after the cross-breeding and mutation blocks replace some of the genes in the gene pool, method 600 can return to block 602. Each gene in the new gene pool can be evaluated again, such as by determining the squared error for each gene. The genes are once again sorted at block 603, mutated and cross-bred at blocks 604 and 605 to form another new gene pool, and so on back to block 602.

A final winner can be determined at block 606. For example, once the iterations over blocks 602-605 have completed, the highest-ranking gene can be selected as the final winning equation. In the example introduced above, 20x+15y+z is selected as the winning equation, i.e., the equation that minimizes the squared error of PLT's over the data in table 400.

Various mechanisms can be used to determine when to stop iterating method 600 and declare a final "winner." Regardless of how the final winner is selected, the final winner can be used for normalizing the coefficients as discussed above. For example, blocks 602-605 can be performed 1000 times, and the single highest-ranking gene selected as the winner. Alternatively, blocks 602-605 can be performed for a fixed period of time, e.g., 3 days, before a final winner is selected.

Other implementations can use the performance of the top-ranking gene to determine when to stop iterating and declare a winner. For example, blocks 602-605 can continue until the top-ranking gene remains the same for 100 iterations through the algorithm. Alternatively, blocks 602-605 can continue until the top-ranking gene achieves a certain level of fitness, e.g., a squared error within a certain range (perhaps 1%) of the measured values.

In further embodiments, the gene pool size can be varied. In the discussion above, a fixed initial gene pool size of 100 equations was introduced, and each iteration of blocks 602-605 maintained the fixed gene pool size. However, in some embodiments, the gene pool size can be manipulated based on whether the top-ranking gene improves or remains unchanged. Generally speaking, constant improvements in the fitness of the top-ranking gene generally suggest that the gene pool can be reduced in size to speed up the algorithm. Likewise, if the top-ranking gene does not improve over time, a larger gene pool can be utilized to increase the likelihood of finding a gene that is more fit than the current top-ranking gene.

For example, assume that after 10 iterations of blocks 602-605, the top-ranking gene is unchanged. The gene pool size can be increased at this time to 150 equations, to increase the probability that a new, higher-ranking gene will be found in subsequent iterations. In contrast, if the top-ranking gene continues to improve through each iteration, the gene pool size can be reduced. For example, after 10 consecutive iterations where the top-ranking gene is replaced by a more fit gene, the gene pool can be reduced to 50 equations. This may have the beneficial effect of speeding up the convergence of the algorithm by evaluating and modifying fewer genes on each iteration.

CONCLUSION

Although techniques, methods, devices, systems, etc., pertaining to the above implementations are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed by at least one computer processing unit, the method comprising:
    logging data including outcomes, first values of a first parameter associated with the outcomes, and second values of a second parameter associated with the outcomes;
    using a machine learning technique to learn an equation from the data, wherein the equation comprises:
        a first term including the first parameter, the second parameter, and a learned first coefficient that appears in the first term with the first parameter and the second parameter, and
        a second term including the second parameter but not the first parameter and a learned second coefficient that appears in the second term with the second parameter and not the first parameter;
    after the machine learning technique has learned the equation comprising the learned first coefficient and the learned second coefficient:
        normalizing the learned first coefficient of the first term of the learned equation based on average values of the first term that includes both the first parameter and the second parameter;
        normalizing the learned second coefficient of the second term of the learned equation based on average values of the second term that includes the second parameter and not the first parameter; and
        ranking the first term and the second term in order of contribution to the outcomes based on the normalized learned first coefficient and the normalized learned second coefficient.

2. The method according to claim 1, wherein the machine learning technique is a genetic algorithm and using the genetic algorithm comprises cross-breeding multiple equations from a pool by replacing terms from individual equations of the pool with other terms from other equations of the pool.

3. The method according to claim 1, wherein the first term includes the first parameter divided by the second parameter.

4. The method according to claim 3, wherein normalizing the learned first coefficient comprises dividing the learned first coefficient by an average value of the first parameter divided by the second parameter.

5. The method according to claim 4, wherein the second term includes a logarithm operation applied to the second parameter.

6. The method according to claim 5, wherein normalizing the learned second coefficient comprises dividing the learned second coefficient by an average value of the logarithm operation applied to the second parameter.

7. A system comprising:
at least one processing unit; and
at least one memory device or storage device storing instructions which, when executed by the at least one processing unit, cause the at least one processing unit to:
obtain data including measured times to perform a computing task and values of parameters that are associated with the measured times to perform the computing task, the parameters including a first parameter and a second parameter;
use a machine learning algorithm to learn an equation based on the data, the learned equation comprising a first term having a learned first coefficient and a first mathematical operation applied to the first parameter and a second term having a learned second coefficient and a second mathematical operation applied to the second parameter, wherein the first mathematical operation and the second mathematical operation are different mathematical operations; and
evaluate the first parameter and the second parameter for relative contribution to the measured times to perform the computing task by normalizing the learned first coefficient using average values of the first mathematical operation and normalizing the learned second coefficient using average values of the second mathematical operation.

8. The system according to claim 7, wherein the instructions cause the at least one processing unit to rank the first term having the first mathematical operation relative to the second term having the second mathematical operation for relative contribution to the measured times to perform the computing task based on the normalized learned first coefficient and the normalized learned second coefficient.

9. The system according to claim 7, wherein:
the first mathematical operation is a power function of the first parameter,
the second mathematical operation is a division of the second parameter by a third parameter associated with the measured times to perform the computing task, and
the instructions cause the at least one processing unit to:
calculate an average value of the power function of the first parameter;
normalize the learned first coefficient by dividing the learned first coefficient by the average value of the power function of the first parameter;
calculate an average value of the division of the second parameter by the third parameter; and
normalize the learned second coefficient by dividing the learned second coefficient by the average value of the division of the second parameter by the third parameter.

10. One or more computer-readable storage devices having stored instructions which, when executed by one or more computer processing units, cause the one or more computer processing units to perform acts comprising:
measuring web page load times for one or more web pages;
storing the measured web page load times in a database with associated values of web page parameters including at least a first web page parameter and a second web page parameter;
applying a genetic algorithm to the web page load times and the associated parameter values to generate a winning equation that determines calculated web page load times, the winning equation comprising:
a first coefficient multiplied by the first web page parameter, and
a second coefficient multiplied by the second web page parameter;
normalizing the first coefficient and the second coefficient based on the values of the web page parameters; and
ranking the first web page parameter relative to the second web page parameter for contribution to the measured web page load times based on the normalized first coefficient and the normalized second coefficient.

11. The one or more computer-readable storage devices according to claim 10, wherein applying the genetic algorithm comprises selecting the winning equation from a pool of equations.

12. The one or more computer-readable storage devices according to claim 11, wherein applying the genetic algorithm further comprises mutating a subset of equations from the pool by altering corresponding coefficients, corresponding parameters, or operators of the subset of equations.

13. The one or more computer-readable storage devices according to claim 11, wherein applying the genetic algorithm further comprises cross-breeding a first equation from the pool with a second equation from the pool by taking terms from the first equation and the second equation to generate a third equation.

14. The one or more computer-readable storage devices according to claim 10, wherein the web page parameters include a size of the one or more web pages, a number of files of each of the one or more web pages, and a largest file size for each of the one or more web pages.

15. The one or more computer-readable storage devices according to claim 10, wherein the first coefficient is normalized by dividing the first coefficient by a first average value of the first parameter.

16. The one or more computer-readable storage devices according to claim 10, the acts further comprising displaying the ranking of the first web page parameter relative to the second web page parameter in a graphical user interface.

17. The one or more computer-readable storage devices according to claim 10, wherein the winning equation includes a term that comprises a nonlinear combination of the web page parameters.

18. The one or more computer-readable storage devices according to claim 10, the acts further comprising receiving the web page load times from one or more client devices that load the web pages.

19. The one or more computer-readable storage devices according to claim 10, embodied in a web site server.

20. The one or more computer-readable storage devices according to claim 19, wherein at least one of the web pages is hosted remotely from the web site server.

* * * * *